(Model.)
J. C. BEAMER & J. M. RICHARDSON.
NUT LOCK.
No. 252,716. Patented Jan. 24, 1882.
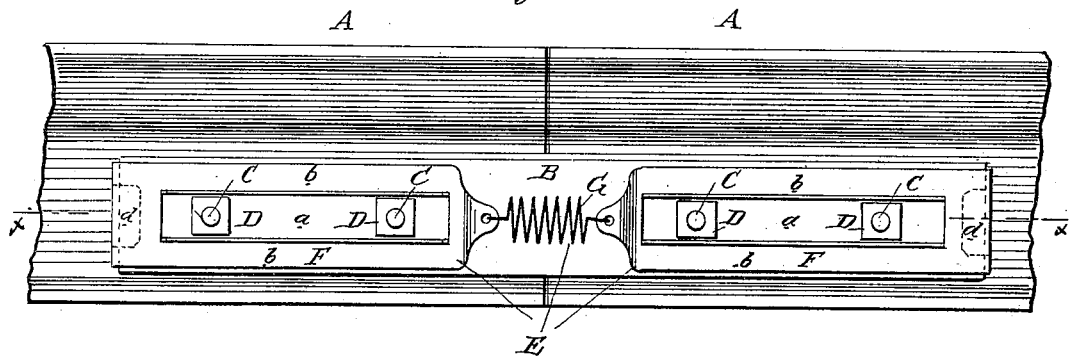
Fig. 1.
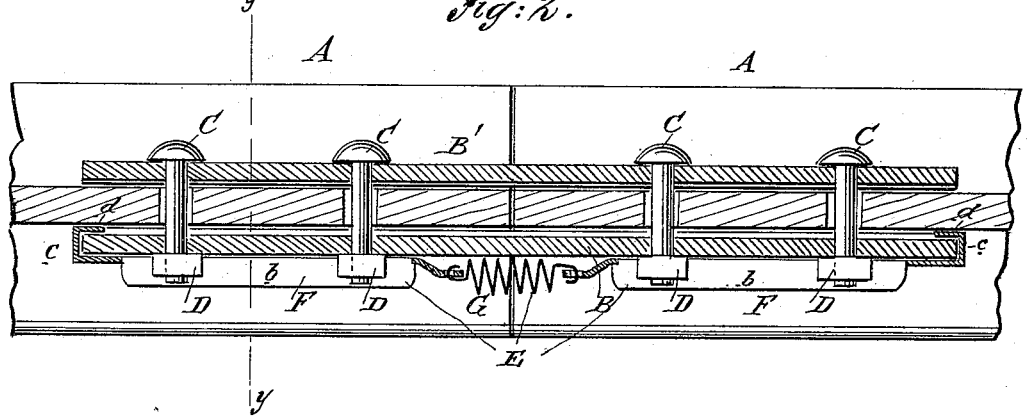
Fig. 2.
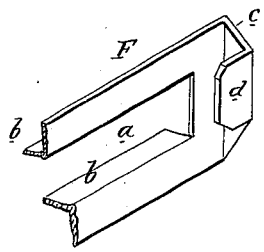
Fig. 4.
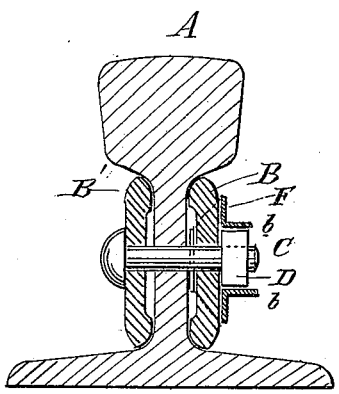
Fig. 3.
Fig. 5.
WITNESSES:
Chas. Nida.
C. Sedgwick.
INVENTOR:
J. C. Beamer
J. M. Richardson
BY Munn & Co.
ATTORNEYS.

United States Patent Office.

JAMES C. BEAMER AND JOHN M. RICHARDSON, OF CARTHAGE, MISSOURI.

NUT-LOCK.

SPECIFICATION forming part of Letters Patent No. 252,716, dated January 24, 1882.

Application filed August 15, 1881. (Model.)

*To all whom it may concern:*

Be it known that we, JAMES C. BEAMER and JOHN M. RICHARDSON, of Carthage, in the county of Jasper and State of Missouri, have invented a new and Improved Railroad Nut-Lock, of which the following is a specification.

The object of this invention is to prevent the nuts working off the bolts that fasten the fish-bars to the rails. The trains running over the track jar and shake the rails and cause the nuts as ordinarily applied to work loose and turn off. With this railroad nut lock the nuts cannot work off, because it will be impossible for the nuts to turn on the bolts.

The invention consists of two plates of strong sheet-iron or other suitable material wide enough to cover the fish-bar, with each edge resting on the rail. Each plate is centrally slotted, and the edges of the slot are turned outward wide enough and long enough to stand out over both nuts in the end of a rail. These plates are connected at one end with a spiral spring, and their other ends are formed into hooks that go around and under the ends of the fish-bar.

In order to put the nut-lock in position, the plates are pulled apart and the hooked ends fastened to each end of the fish bar, and when adjusted the spiral spring draws the said plates together and tightens them sufficiently to hold them in their places. To remove the nut-lock the two plates are pulled apart from the center.

By the use of this nut-lock the bolts will be protected and the constant watching and tightening of the nuts will be avoided, and the threads of the bolts will be preserved for years, being neither injured nor worn off.

Figure 1 is a front elevation, showing the improved nut-lock applied to the nuts of the fish-plate bolts of a railroad. Fig. 2 is a longitudinal section of the same on line *x x*, Fig. 1. Fig. 3 is a cross-section of the same on line *y y*, Fig. 2. Fig. 4 is a perspective view of a portion of the lock. Fig. 5 is an elevation of the reverse of a portion of the lock.

Similar letters of reference indicate corresponding parts.

In the drawings, A A represent railroad-rails, and B B' the fish-plates, held thereon by bolts C C and nuts D D.

The nut-lock E consists of two plates, F F, united by a spiral spring, G, connecting their inner ends. Each plate F has a horizontal opening or slot, *a*, in its center, designed to be of the width of a nut, D, and along each side of the slot *a* is a flange, *b*, at right angles to the body of the plate F, and designed to fit against the side of a nut, D, and prevent it from turning. The outer end of each plate F is bent down at right angles, as shown at *c*, for about the thickness of the fish-plate B, and the extremity of said plate end is bent inward parallel with the body of the plate F, as shown at *d*, whereby the end of said plate F is made capable of hooking over the end of any suitable object, such as the fish-plate B. These plates F, being placed over the nuts D, as shown, with their hooked ends caught over the ends of the fish-plate B and their flanges *b* against opposite sides of the nuts D, the spiral spring G draws said plates F together with sufficient force to hold them in their places, and thereby prevent the turning of the nuts D.

We do not claim the broad idea of using plates with flanged bolt-holes for nut-locks, as we are aware that such plates have been made; but,

Having thus fully described our invention, we claim as new and desire to secure by Letters Patent—

The combination, with plates F, nuts D, and fish-bars B, of the spiral spring G, substantially as herein shown and described, whereby the plates F are severally kept in position, as set forth.

JAMES C. BEAMER.
JOHN M. RICHARDSON.

Witnesses:
E. R. WHEELER,
JAMES PATTERSON.